United States Patent [19]
Brown et al.

[11] Patent Number: 5,500,620
[45] Date of Patent: Mar. 19, 1996

[54] TIMING RECOVERY FOR DIGITAL DEMODULATION

[75] Inventors: Geoffrey B. D. Brown, Bishops Stortford, United Kingdom; David W. Park, Ottawa, Canada

[73] Assignee: Northern Telecom Limited, Montreal, Canada

[21] Appl. No.: 226,008

[22] Filed: Apr. 11, 1994

[51] Int. Cl.6 .................................. H03D 3/00; H04L 7/00
[52] U.S. Cl. .......................... 329/300; 329/304; 375/355
[58] Field of Search ................................. 329/300–310; 375/354, 355, 365

[56] References Cited

U.S. PATENT DOCUMENTS

| | | | |
|---|---|---|---|
| 4,334,313 | 6/1982 | Gitlin et al. | 375/355 |
| 4,849,991 | 7/1989 | Arnold et al. | 375/330 |
| 4,937,841 | 6/1990 | Chuang et al. | 375/340 |
| 4,941,155 | 7/1990 | Chuang et al. | 375/330 |
| 5,084,891 | 1/1992 | Ariyavisitakul et al. | 371/42 |

*Primary Examiner*—David Mis
*Attorney, Agent, or Firm*—Lee, Mann, Smith, McWilliams, Sweeney & Ohlson

[57] ABSTRACT

A method of demodulating an oversampled digitised analogue signal F(t) wherein n samples per bit of the digitised signal represent the instantaneous frequency and/or phase of the signal. The method includes the steps of selecting a sequence of bits containing bit value transitions, determining the magnitude of F(t) within the sequence so that all the extrema are maxima (or minima), whereby the maxima (or minima) of |F(t)| provide a defined timing position in relation to the bits of the sequence. The value of |F(t)| over a succession of said bits is averaged and a timing control signal is derived therefrom for demodulation of the digitised analogue signal.

4 Claims, 4 Drawing Sheets

TIMING RECOVERY FOR DIGITAL DEMODULATION

BACKGROUND OF THE INVENTION

This invention relates to digital demodulation of a digitally modulated analogue r.f. signal, such as is used in TDMA radio systems.

In mobile radio telephony systems, e.g. cellular systems and the like, low power time division multiplexed radio links are used between the mobile transmitter/receivers and fixed base stations. Transmission is in the form of digital bit stream burst which modulate a predefined carrier radio frequency. Various forms of modulation are known, including quadrature phase shift keying (QPSK) and Gaussian minimum shift keying (GMSK). Hence a receiver is required to demodulate an input r.f. signal which has been downconverted to form an analogue IF signal of the general form $$y(t) = A . \sin(\omega_F t + \phi(t))$$

when derived for a GMSK modulator. An important aspect of the overall receiver operation is to extract timing information from the incoming signal to enable satisfactory demodulation to be performed. Demodulation is achieved by sampling the waveform in each bit period and it will be understood that correct bit synchronisation is essential, particularly where the timing of the bit periods in the incoming signal is liable to slippage. Several proposals have been put forward to achieve correct bit synchronisation in a receiver. Of special interest are arrangements involving digitising of the signal followed by oversampling and digital signal processing to determine the proper bit symbol timing. Such arrangements are disclosed in U.S. Pat. Nos. 4,849,991; 4,937,841; 4,941,155 and 5,084,891.

SUMMARY OF THE INVENTION

A block diagram of a demodulator is shown in FIG. 1, and the demodulator functions are now briefly described.

The demodulator input is an analogue IF signal. This can be considered to have the form $$y(t) = \sin(\omega_{IF} t + \phi(t))$$

which was derived for a GMSK modulator. Actually the DECT specification allows a wide range of GFSK input signals, but the principles of the demodulator can be illustrated without loss of generality with reference to this GMSK input. In the actual receiver, the signal is processed by a limiting amplifier. However, this description will use a sine-wave description of the signal; the principles are the same.

ADC

The input IF is converted to digital samples (analogue-to-digital conversion) at an appropriate rate. so that the demodulator functions can be implemented using DSP techniques. In the following description, where the demodulation functions are described in terms of analogue waveforms, it will be understood that samples of those waveforms are actually processed. The rate at which samples are converted is not necessarily locked to, or synchronous with, the received IF signal or bit stream. A system advantage occurs in simplifying the design of the demodulator if the sample rate is asynchronous.

Down-conversion

The sampled input waveform $$y(t) = \sin(\omega_{IF} t + \phi(t))$$

is multiplied by quadrature local-oscillator signals cos($\omega$IFt) and sin($\omega$IFt) and low-pass filtered to give zero-IF signals $$I(t) = (\tfrac{1}{2}) \cos(\delta\omega \times t + \phi(t))$$

and $$Q(t) = (\tfrac{1}{2}) \sin(\delta\omega \times t + \phi(t))$$

respectively, where $$\delta\omega = \omega_{IF} - \omega'_{IF}$$

is the angular-frequency offset between the transmitter and the receiver. The Multiplication (ie mixing) also produces components at $\omega_{IF} + \omega'_{IF}$ but these are removed by the low-pass filters.

Phase/frequency discrimination

Zero-IF phase discrimination consists of calculating the instantaneous phase $$\Phi(t) = \arctan(Q(t)/I(t)) = \delta\omega \times t + \phi(t)$$

where $\phi(t)$ contains all the information about the transmitted bit-stream.

With reference to $\phi(t)$ for a GMSK transmission it can be shown that $\phi(t)$ increases throughout a bit period whenever a '1' is transmitted, and decreases throughout a bit period whenever a '0' is transmitted. The DECT specification ensures (a) $\phi(t)$ will always increase for a '1' and decrease for a '0', because GFSK requires the instantaneous frequency to increase or decrease.

(b) $\delta\omega \times t$ may be significant compared with $\phi(t)$ because of the allowed tolerances of transmitter and receiver frequencies. However the demodulator suppresses this offset in its frequency offset correction section.

Thus the demodulator must implement a simple frequency discriminator by calculating $F(t) = \Phi(t) - \Phi(t - 1/f_b)$.

Frequency-offset correction

The contribution of $\delta\omega \times t$ to $\Phi(t) - \Phi(t - 1/f_b)$ is $\delta\omega/f_b$, i.e. the frequency discriminator output contains a dc bias due to the receiver mis-tuning. The performance of the demodulator is clearly optimised when $\delta\omega = 0$, i.e. when the frequency demodulator output has equal positive and negative swings. When $\delta\omega \neq 0$, the dc bias can be calculated and subtracted from the frequency discriminator output; the result of this offset-frequency correction is similar to making the receiver track the transmitter frequency. This avoids the need for a complex radio frequency synhesiser with automatic frequency control circuitry.

After correction, $\Phi(t) = \phi(t)$ and the frequency discriminator output is $$F(t) = \phi(t) - \phi(t - 1/f_b)$$

Timing recovery

Consider demodulation of the transmitted bit stream 1 0 1 0 . . . ; the instantaneous frequency of the ZIF signal in the demodulator is alternately positive ($\phi(t)$ increasing) and negative ($\phi(t)$ decreasing). The frequency discriminator output $F(t) = \phi(t) - \phi(t - 1/f_b)$ oscillates between positive and negative extremes with zeros in between.

The bit-timing recovery process consists of finding the optimum timing, once per bit, when $\phi(t) - \phi(t - 1/f_b)$ is at an extreme. Once the timing is established, this extreme value can be passed on to the decision process (which decides whether this bit is a '1' or a '0').

If the bit stream is all-ones or all-zeros the timing recovery process is impossible because $\phi(t)-\phi(t-1/f_b)$ becomes a constant value. The process relies on 1-0 and 0-1 transitions, therefore the DECT system specifies a 16-bit alternating preamble at the start of every slot, and this guarantees timing recovery.

Burst correlation

So that the demodulator can identify the start of the data field (D-field). the DECT system specifies a 16-bit synchronisation (SYNC) word between the preamble and the D-field. Having obtained bit synchronisation (i.e. timing recovery) during the preamble, the demodulator correlates the known SYNC word with the demodulated bit stream until SYNC is detected. A satisfactory correlation establishes burst synchronisation for the current slot. Incidentally, the handset SYNC is the inverse of the base-station SYNC; each MODEM must use the appropriate SYNC.

On detection of SYNC, the burst correlator may lock the timing-recovery circuit. This may be necessary because there may be insufficient 0-1 and 1-0 transitions within the D-field data to maintain correct timing recovery. Thus the bit timing obtained up to and including burst synchronisation is used for the remainder of the slot, i.e. during the D-field data.

Timing recovery

The demodulator is designed so that the input F(T) to the timing recovery circuit provides nominally eight samples per bit, representing the instantaneous frequency of the input signal. Generally, only one of these samples is optimally aligned with the received bit. The purpose of the timing recovery circuit is to decide which sample is optimal. The optimal samples contain the identity of the received data stream in their sign bits, so this circuit completes the demodulator functions (except that burst correlation is applied to the demodulated bit stream).

It is important to be able to obtain timing recovery on a running basis, i.e. without having to store a slot-full of data samples for retrospective processing. This reduces the data storage requirements of the demodulator and also reduces the processing delay that can occur in such a design.

Successful timing recovery relies on the presence of 1-0 and 0-1 transitions in the transmitted data so that F(t) swings between positive and negative values, Without such transitions F(t) is constant and there is no way of determining the boundaries between one bit and the next. Timing recovery must therefore be done during the preamble, and can be continued through the synchronisation word. It must not continue during the following data because a long string of uninterrupted 1's and 0's could cause the timing point to drift away from its correct value.

Timing recovery could be based on detecting the zeros of F(t) which occur at 1-0 and 0-1 boundaries, but bear in mind that noise can cause a single zero to split into three or more zeros. The alternative approach is to look for the maxima and minima of F(t); these are the optimum samples which decode the GFSK input. This is equivalent to finding the maximum 'eye opening' of F(t). The chosen method first finds the magnitude of F(t) so that all extrema are maxima; the maxima of |F(t)| coincide with the optimum timing position. The optimum timing is averaged over 16 bits, to reduce errors due to noise.

According to the invention there is provided a method of demodulating an oversampled digitised analogue signal F(t) wherein n samples per bit of the digitised signal represent the instantaneous frequency and/or phase of the signal, the method including the steps of selecting a sequence of bits containing bit value transitions, determining the magnitude of F(t) within the sequence so that all the extrema are maxima (or minima), whereby the maxima (or minima) of |F(t)| provide a defined timing position in relation to the bits of the sequence, averaging the value of |F(t)| over a succession of said bits and deriving therefrom a timing control signal for demodulation of the digitised analogue signal.

In one embodiment of the invention there is provided a method of demodulating a digitised analogue signal wherein said signal is preceded by a preamble comprising a sequence of bits of the signal bit rate, said preamble bits having alternating digital values, including the steps of oversampling the preamble and the signal to provide n samples per bit, determining the magnitude of each sample, averaging the value of a number of successive occurrences of each of a group m of successive samples of the sequence, determining the maximum (or minimum) averaged sample value to provide a bit timing pointer, gating the samples of the sampled signal subsequent to the sequence to select one sample for each signal bit, said gating step being effected at a time predetermined in relation to said timing point.

In another embodiment of this invention the group m of averaged samples is greater than the number n of samples per bit, the method further including the step of ascertaining the position within the group of m samples of the averaged maximum (or minimum) value during the averaging of the values of each group of m samples and altering the overall position in time of the succeeding group of m samples to maintain the position of the maximum (or minimum) at a predetermined position within the group.

The invention also provides apparatus for demodulating an oversampled digitised analogue signal F(t) wherein n samples per bit of the digitised signal represent the instantaneous frequency and/or phase of the signal, including means for selecting a sequence of bits containing bit value transitions, means for determining the magnitude of F(t) within the sequence so that all the extrema are maxima (or minima), whereby the maxima (or minima) of |F(t)| provide a defined timing position in relation to the bits of the sequence, means for averaging the value of |F(t)| over a succession of said bits and means for deriving therefrom a timing control signal for demodulation of the digitised analogue signal.

BRIEF DESCRIPTION OF THE DRAWINGS

Embodiments of the invention will now be described with reference to the accompanying drawings, in which.

DESCRIPTION OF THE PREFERRED EMBODIMENTS

Figure 2:
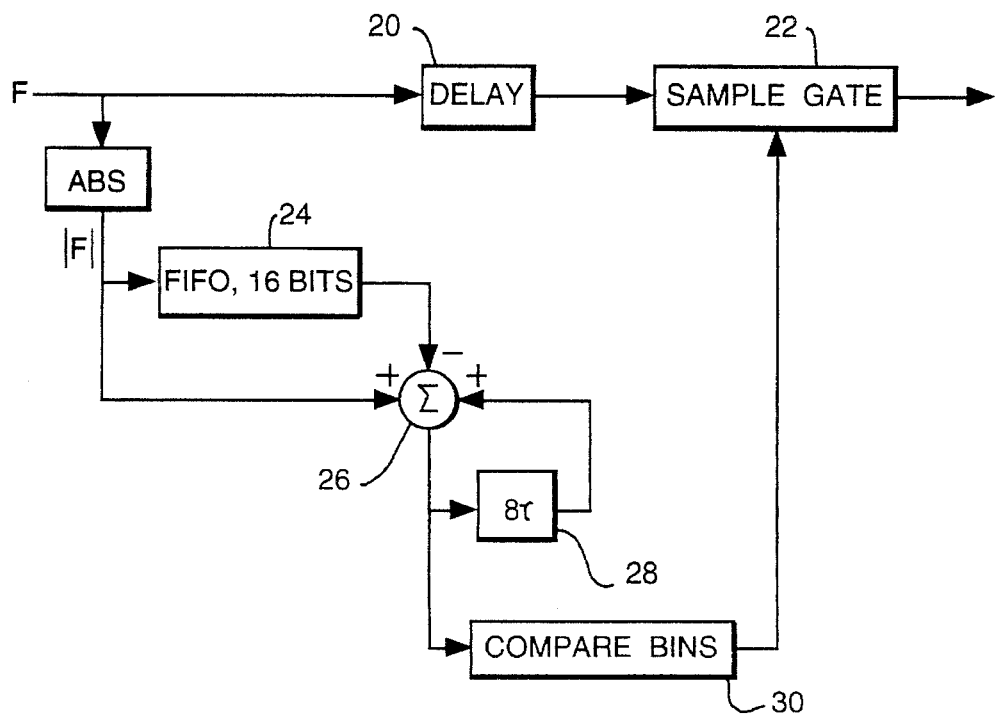
FIG. 2 is a block diagram of a hypothetical timing recovery circuit.

Before describing an actual design of timing recovery circuit according to the invention it is instructive to refer to the hypothetical timing recovery circuit of FIG. 2.

The incoming samples F(t) are fed via a delay 20 to a sample gate 22, 8 samples (i.e. nominally 1 bit) at a time. Meanwhile the |F(t)| samples are fed into a first-in-first-out (FIFO) 16-bit shift register 24. The output of the final stage of shift register 24 is subtracted in summing network 26 from the incoming samples |F(t)| and the output of the summing network is fed back via a delay 28, of value 8τ where τ is one sample period, to summing network 26 to be added to the incoming samples |F(t)|. This process results in the average value of |F(t)| being obtained. The stream of samples output from summing network 26 is also fed to a set of eight bins 30 (0 to 7) which may be coincident with delay 28 where the contents of the individual bins are compared by a logic circuit (not shown) to find the maximum bin. The output of the logic circuit, i.e. the position of the maximum bin, controls the sample gate 22. Therefore for each group of eight samples (i.e. one nominal bit) into the sample gate only one sample is selected for output, this being the optimum sample for that bit. Thus |F(t)| is averaged over a 16-bit sliding window, i.e. over 128 samples (the +16 to convert the sum to an average is unnecessary and is omitted). Since the integrator delay is 8 this means that bits are overlaid rather than samples. The output of the integrator at time j can be derived algebraically as $$\sum_{0 \geq n} (s[j-8n] - s[j-128-8n]) =$$

$$\sum_{0 \geq n} s[j-8n] - \sum_{16 \geq n} s[j-8n] = \sum_{0 \geq n < 16} s[j-8n]$$

Figure 3:
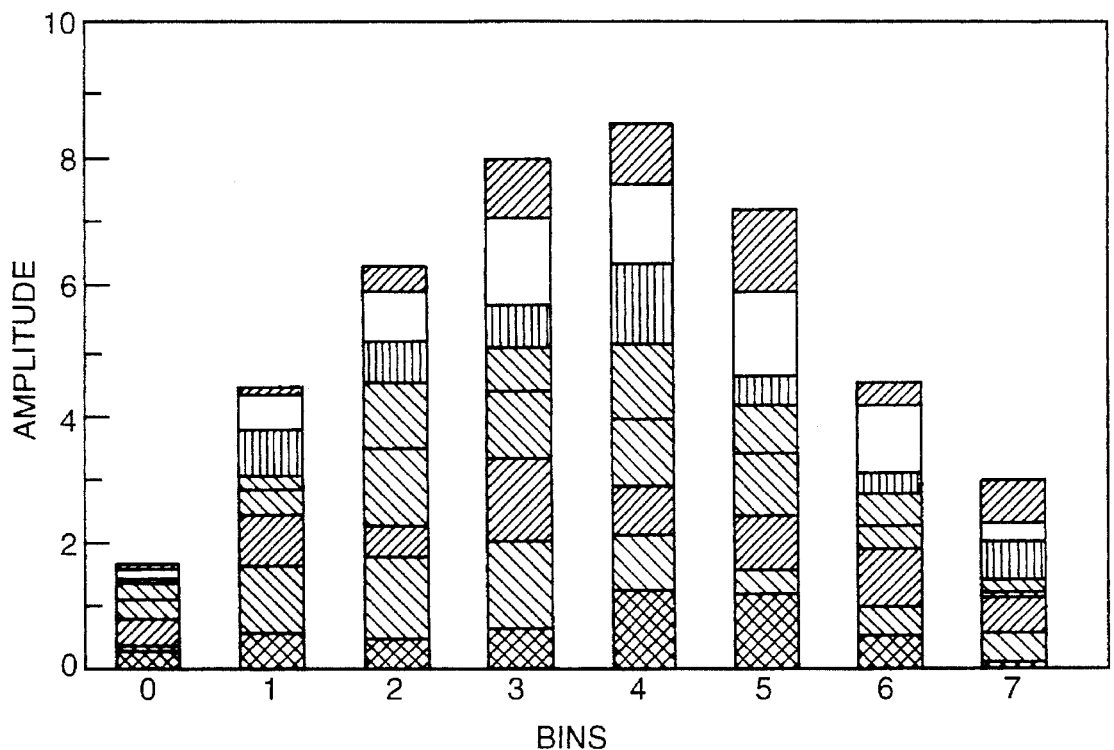
FIG. 3 illustrates accumulation of samples into "bins"
Figure 4:
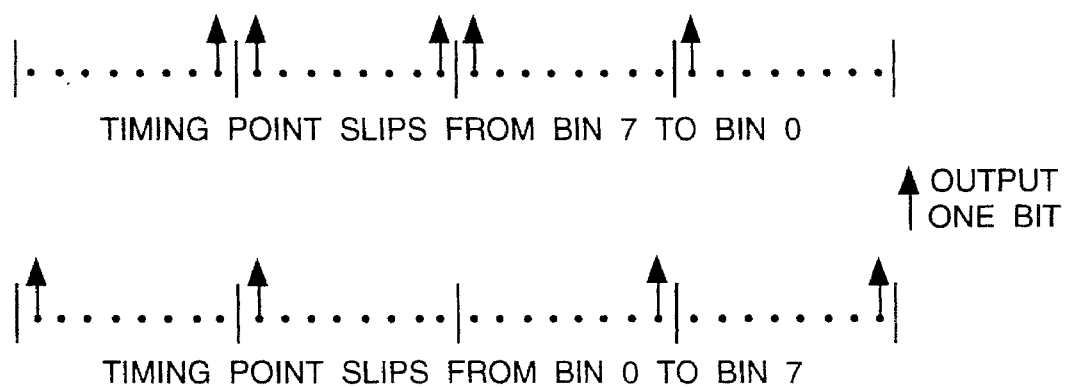
FIG. 4 illustrates error conditions which can arise in the arrangement of FIG. 2.

The result is to accumulate the samples from sixteen bits into eight "bins". This is illustrated qualitatively in FIG. 3 for a noisy input (with only eight bits accumulated). The arrangement of FIG. 2 contains one fatal flaw however. Recall that the received bit stream is asynchronous with the demodulator sample clock, so that the optimum sample can be in any of bins 0 to 7, and can move cyclically around the bins. However the sample gate always processes consecutive batches of 8 samples. Consider what happens when the maximum slides from bin 7 to bin 0. As illustrated in the top half of FIG. 4, the sample gate releases samples 7 of one group of eight, followed immediately by sample 0 of the next group of eight. (In this figure, the arrows indicate the samples released by the gate). Since in this case the boundaries between groups of eight lie in the middle of the received bits, two samples are output from the same bit so that one demodulated bit is duplicated. Similarly (see bottom half of FIG. 4) when the maximum slides from bin 0 to bin 7, a demodulated bit is missed. In either case it means that the burst synchronisation is wrong for the following bits.

Figure 5:
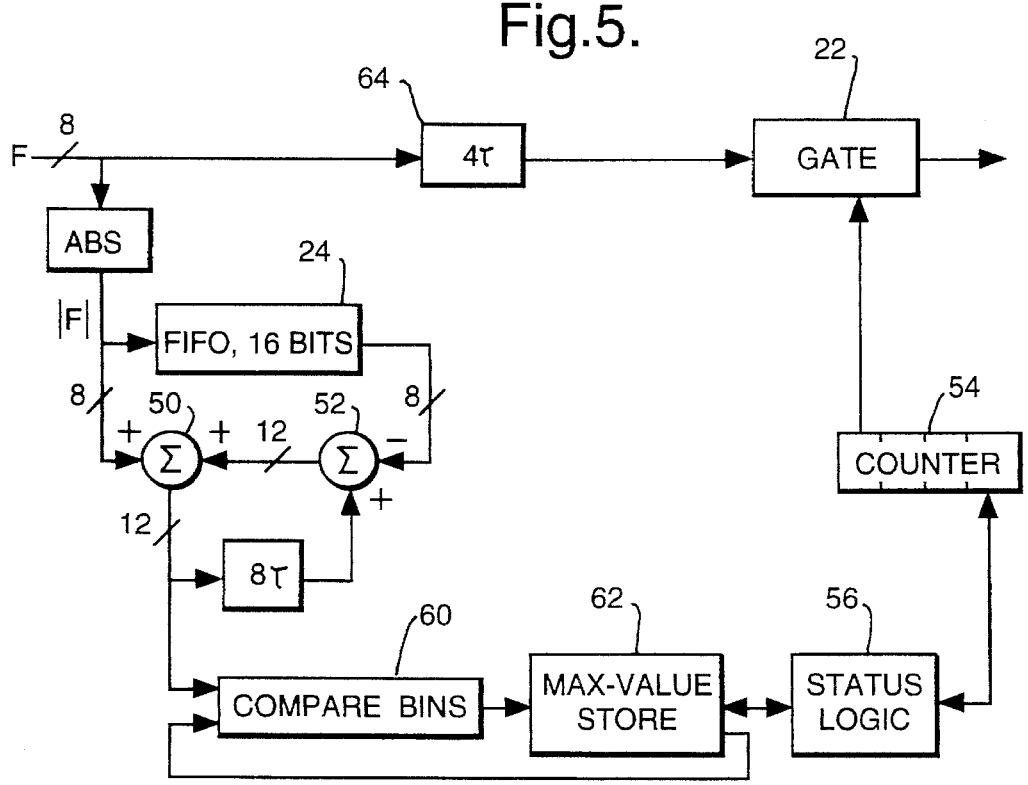
FIG. 5 is a block diagram of a timing circuit arrangement according to the invention.

The difficulty with the circuit of FIG. 2 is that the sample gate processes samples strictly eight at a time, and errors occur when the optimum timing point moves beyond the boundaries of this fixed eight-bit window. The solution, which is implemented in FIG. 5, produces a sliding 8-sample window which keeps itself centred on the optimum timing point. Since the optimum timing point does not now move beyond the boundaries of the window, the problem illustrated in FIG. 4 disappears and this circuit fully handles the asynchronous timing of the demodulator. The essential difference between the two circuits of FIG. 2 and FIG. 5 is this; the sample gate of FIG. 2 outputs at a variable time (i.e. sample 0 to 7) within a fixed window, but FIG. 5 outputs at a fixed time within a movable window. There is no restriction on the amount by which the movable window can move to accommodate the bit timing of the receive waveform. The movable window moves by the following mechanism. The counter counts nominally 8 samples from one bit to the next, but when an adjustment is necessary the count is modified to 7 (to advance the timing point by one sample) or to 9 (to delay the timing point). The timing point therefore moves, one sample at a time, to track the incoming signal. The maximum rate of change is one sample per bit (i.e. 1 in 8) which is more than adequate to track the highest bit-rate deviation allowed by the DECT specification and sufficient to recover the optimum timing position within the length of the preamble sequence.

Figure 1:
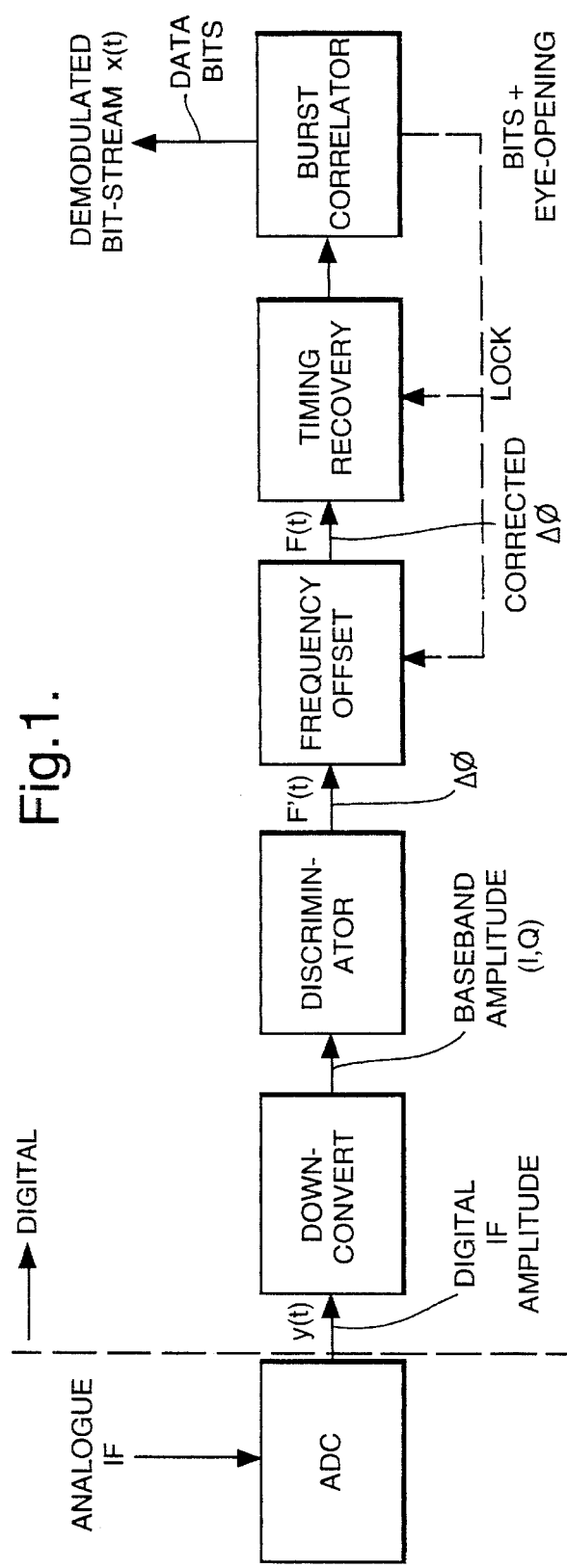
FIG. 1 is a block diagram of a digital demodulator (already referred to)
Figure 6:
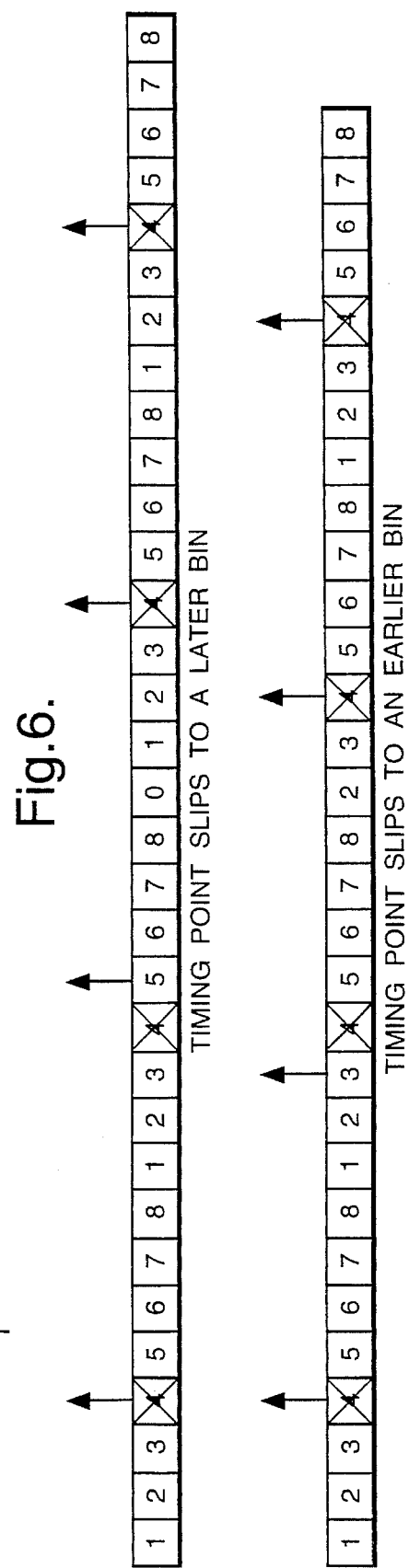
FIG. 6 illustrates the operation of the timing circuit of FIG. 5.

We now describe the details of operation of the timing recovery circuit. The eight bins are calculated from a sixteen-bit running average exactly as in FIG. 2; the only difference in this part of the circuit is that the 3-input adder is now implemented as two 2-input adders 50, 52 (for practical reasons only). A four-bit counter 54 counts to 8 from a starting value which be 0 to 1 or 2 as decided by the "Status logic" block 56 whose function is to keep the movable 8 bin sliding window centred on the optimum timing point as explained before. The gate 22 always outputs a sample corresponding to the count of 4. FIG. 6 illustrates the timing sequences generated when the optimum bin changes, in this Figure the arrows represent the bin containing the highest accumulated amplitude, while the crosses mark the samples which are released by the gate.

The "compare bins" logic 60 works in conjunction with the "max-value store" 62; the latter stores a peakcount variable and a maxstore variable. On every value of count except 0, the incoming bin-value is compared with maxstore. If the incoming value is greater than maxstore, then the value is stored in maxstore and count is stored in peakcount. When count reaches 8, maxstore is cleared to zero in preparation for the next set of comparisons. Hence when count next reaches 8, peakcount contains the position of the maximum bin.

If the final value of peakcount is 4, i.e. it coincides with the output sample, the moving window is perfectly aligned. If the final value of peakcount is less than 4, the optimum timing position is earlier than the output sample and the moving window must be advanced to bring it in line with the optimum timing position. Similarly, if the final value of peakcount is greater than 4, the moving window must be retarded. Thus the "status logic" sets the initial value of count as shown in the following table:

| Final value of Peakcount | Starting value of Count |
| --- | --- |
| 0, 1, 2, 3 | 2 |
| 4 | 1 |
| 5, 6, 7, 8 | 0 |

The "delay" block 64 in FIG. 5 retards the signal by four samples. Thus the output sample, which arrived at the count of 4, is gated out at the count of 8. The delay can be reduced to three samples by gating the output sample when count =7 instead of when count =8.

The demodulated bit stream resides in the sign bits of the output of the timing recovery circuit. This means that in principle only one bit of each output sample need be passed on the timing recovery circuit to the burst-synchronisation circuit of the following section. However the burst-synchronisation circuit may require information on the magnitudes of the detected bits, in order to make "soft decision". Rather than send on the full 8 bit sample, the sign bit (MSB) is sent on together with a 3-bit logarithmic magnitude.

Figure 7:
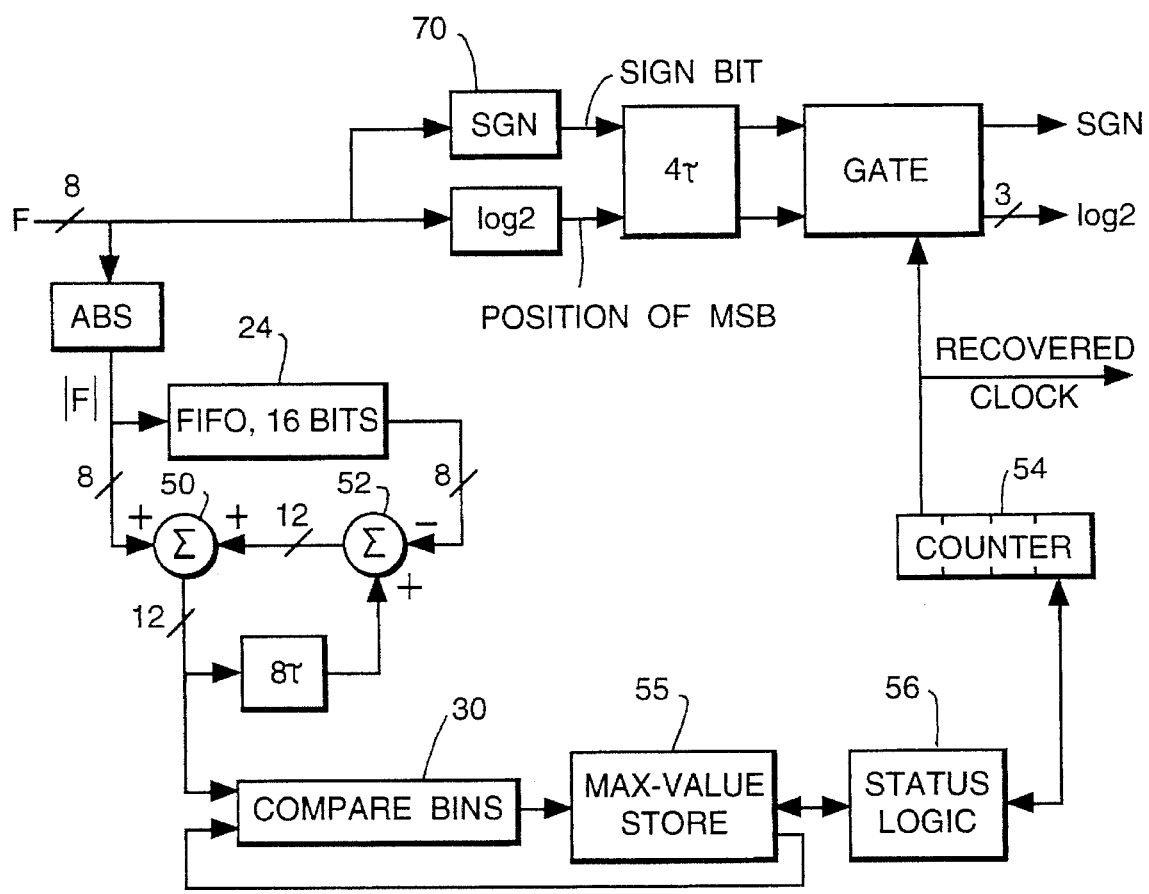
FIG. 7 is a block diagram of a modified version of the arrangement of FIG. 5.

The final version of the timing-recovery circuit therefore appears as shown in FIG. 7. As in FIGS. 2 and 5 the incoming F(t) is averaged and the resulting |F(t)| is fed to FIFO shift register 24 and to the 3input summing network implemented by the 2-input adders 50, 52. The output of the summing network is, as before, fed back via the 8τ delay and to the comparison logic 30. Also, as before, the maximum value is held in store 55 for the bit period and the status logic 56 determines the starting value for the counter 54. Meanwhile the sign bit (bit 7) is stripped off in the sign circuit (SGN) 70. The logarithmic magnitude of the demodulated bit, shown as "log2" in FIG. 7, is simply the position of the MSB of the magnitude. In other words, having stripped off the sign bit (bit 7) and taken the twos-complement inverse if the value was negative, the "log2" function is the position of the most significant '1' as shown in the following table. The exception is when the demodulated bit is exactly zero, in which case "log2" returns the value 1.

The interval between consecutive outputs from the timing recovery circuit can be 7 or 8 or 9 samples, i.e. it varies between 7/8 and 9/8 of the system bit period. These SGN and log2 outputs (see FIG. 7) are retimed to the system bit-clock on input to a burst synchronisation circuit (not shown).

We claim:

1. A method of demodulating an oversampled digitised analogue signal F(t) wherein n samples per bit of the digitised signal represent the instantaneous frequency and/or phase of the signal, the method including the steps of selecting a sequence of bits containing bit value transitions, determining the magnitude of F(t) within the sequence so that all the extrema are maxima (or minima), whereby the maxima (or minima) of |F(t)| provide a defined timing position in relation to the bits of the sequence, averaging the value of |F(t)| over a succession of said bits and deriving therefrom a timing control signal for demodulation of the digitised analogue signal.

2. A method of demodulating a digitised analogue signal wherein said signal is preceded by a preamble comprising a sequence of bits of the signal bit rate, said preamble bits having alternating digital values, including the steps of oversampling the preamble and the signal to provide n samples per bit, determining the magnitude of each sample, averaging the value of a number of successive occurrences of each of a group m of successive samples of the sequence, determining the maximum (or minimum) averaged sample value to provide a bit timing pointer, gating the samples of the sampled signal subsequent to the sequence to select one sample for each signal bit, said gating step being effected at a time predetermined in relation to said timing point.

3. A method according to claim 2 wherein the group m of averaged samples is greater than the number n of samples per bit, the method further including the step of ascertaining the position within the group of m samples of the averaged maximum (or minimum) value during the averaging of the values of each group of m samples and altering the overall position in time of the succeeding group of m samples to maintain the position of the maximum (or minimum) at a predetermined position within the group.

4. Apparatus for demodulating an oversampled digitised analogue signal F(t) wherein n samples per bit of the digitised signal represent the instantaneous frequency and/or phase of the signal, including means for selecting a sequence of bits containing bit value transitions, means for determining the magnitude of F(t) within the sequence so that all the extrema are maxima (or minima), whereby the maxima (or minima) of |F(t)| provide a defined timing position in relation to the bits of the sequence, means for averaging the value of |F(t)| over a succession of said bits and means for deriving therefrom a timing control signal for demodulation of the digitised analogue signal.

* * * * *